UNITED STATES PATENT OFFICE.

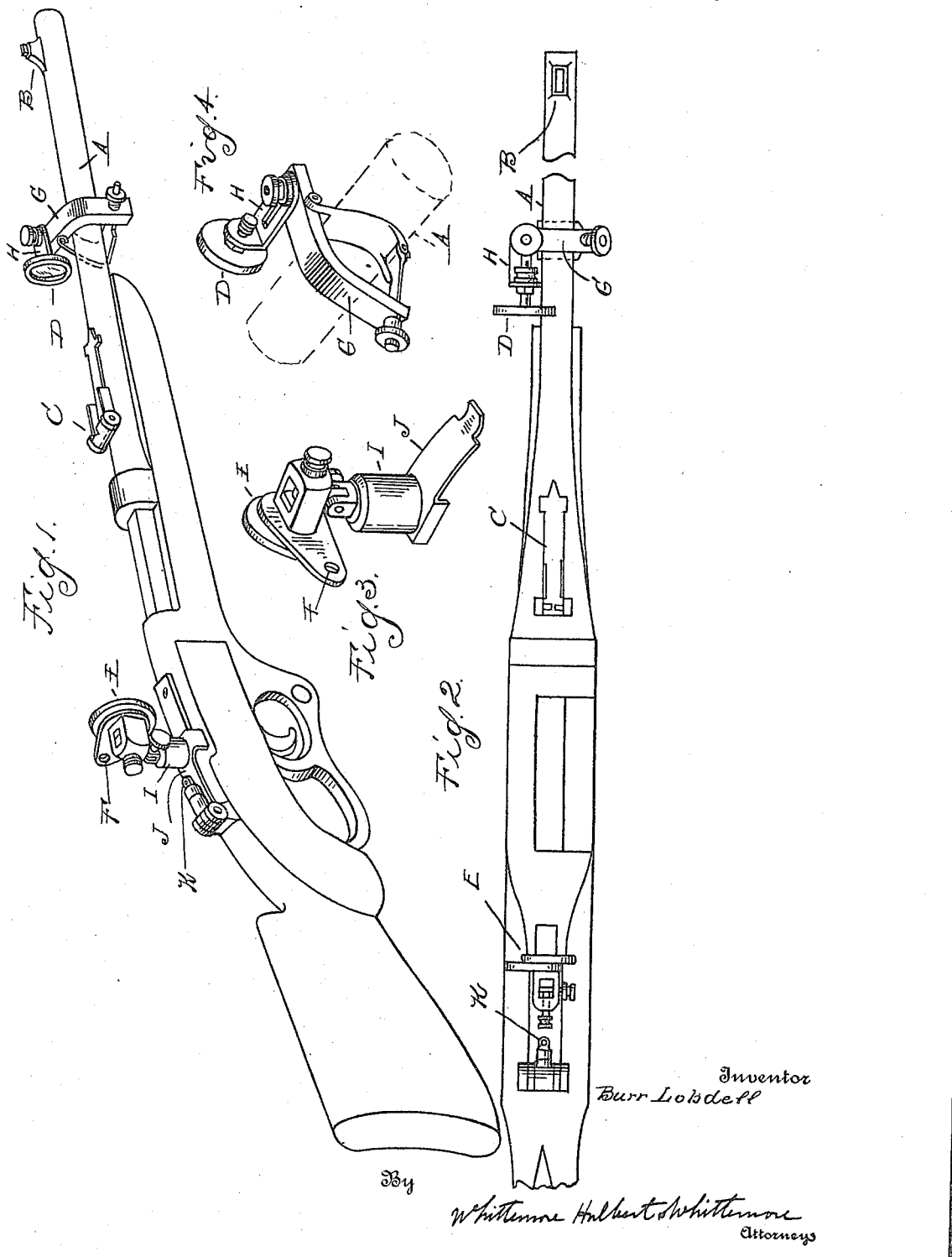

BURR LOBDELL, OF DETROIT, MICHIGAN.

GUN-SIGHT.

1,227,544. Specification of Letters Patent. Patented May 22, 1917.

Application filed January 31, 1916. Serial No. 75,366.

*To all whom it may concern:*

Be it known that I, BURR LOBDELL, a citizen of the United States of America, residing at Detroit, in the county of Wayne and State of Michigan, have invented certain new and useful Improvements in Gun-Sights, of which the following is a specification, reference being had therein to the accompanying drawings.

The invention relates to gun sights, and it is the primary object of the invention to overcome the blurring incident to imperfect focus Such imperfect focus may in many instances be due to defective eye sight, but it is also due to the fact that the forward and rear sights of the gun as usually placed cannot be sharply defined by a common focus. Thus if the vision is focused on the forward sight the rear sight will be blurred, or if focused on the rear sight the forward sight is blurred. In the same manner if the eye is focused upon the distant object aimed at the sights will be out of focus and not sharply defined. To secure a sharply defined focus for both the sights and the object aimed at it would be necessary to remove the former a greater distance from the eye than is possible in gun construction. I have, however, obtained this effect by the interposition between the sights and the eye of reversely-arranged reflectors which increase the visual distance therebetween.

In the drawings:

Figure 1 is a perspective view of a gun to which my improved sight is applied;

Fig. 2 is a plan view thereof;

Fig. 3 is a perspective view of the rear reflector detached; and

Fig. 4 is a similar view of the forward reflector.

A is a gun barrel, which is provided with the usual forward sight or bead B and the rear notched sight C. In addition to these many constructions of gun are provided with additional sights, such as a peep sight arranged at a point still farther in rear. My improvement comprises an attachment to the gun of reflectors, by means of which the sights B and C may be viewed as if placed at a greater distance than the actual distance from the eye. Thus as shown D is a reflector detachably secured to the forward portion of the gun barrel, and E is a counter-reflector arranged on the rear portion of the barrel and in alinement with the sights C and B. The forward reflector D is slightly offset so as to avoid obstructing the line of vision from the sights, and the angles of the reflectors are adjusted so that the reflection in the reflector D may be observed by the eye at one side of the reflector E. To further facilitate observation a peep sight F is arranged adjacent to the reflector E.

In the mechanical construction the reflectors D and E are mounted upon holders which permit of angular adjustment. Thus as shown the forward reflector D is secured by a clamp G which is secured to the gun barrel, and an adjustable angle bracket H forms the means of changing the angle. The rear reflector E is universally pivotally mounted on a post I having a securing tongue J which is conveniently engaged with and secured by the auxiliary sight K with which the gun is provided. Other securing means may, however, be employed in place of that shown.

In use the operator attaches the reflectors D and E and then adjusts the same until the reflection of the alined sights C and B may be conveniently observed through the peephole F. This adjustment has nothing to do with the accuracy of the sight, which is dependent solely upon the correctness of the initial adjustment of the sights C and B. When properly adjusted the gun may be aimed at any object and the bead-sight B alined with the notch-sight C, both of these being in sharp focus.

In addition to the advantage of unblurred vision my improved sight has a further advantage that it avoids the trembling or vibration usually present. This vibration is due to the nearness of the sights to the eye and the effect is intensified where telescopic sights are used. With my improvement the visual distance between the eye and the sights being increased minute and unavoidable movements of the body will not change the sight and there will be no apparent vibration or trembling.

What I claim as my invention is:—

1. In a gun, the combination with alinable sights, of a pair of counter-reflectors for increasing the visual distance between said sights and the eye, and a peep-sight through which the reflection is observable.

2. In a gun, the combination with alinable sights, of a pair of counter-reflectors for increasing the visual distance between said sights and the eye, the forward reflector being clamped to the gun barrel independently of the rear reflector and laterally offset from the line of said sights, and both reflectors being angularly adjustable for proper alinement.

3. In a gun, the combination with a pair of alinable sights, of coöperating counter-reflectors for increasing the visual distance between said sights and the eye, the forward reflector being laterally offset from the line of said sights, a clamp for adjustably securing said forward reflector to the gun barrel, an adjustable mounting for the rear reflector, and a peep-sight secured to said mounting adjacent to said rear sight.

4. In a gun, the combination with alinable sights, of a pair of counter-reflectors for increasing the visual distance between said sights and the eye, one of said reflectors being mounted upon the barrel of the gun and being adjustable about a substantially vertical axis.

5. In a gun, the combination with alinable sights, of a pair of counter-reflectors for increasing the visual distance between said sights and the eye, the forward reflectors being mounted upon the barrel and adjustable longitudinally thereof independently of the rear reflector.

6. In a gun, the combination with alinable sights, of a pair of counter-reflectors for increasing the visual distance between said sights and the eye, and an auxiliary rear sight, the rear reflector being engaged with and secured to said auxiliary sight.

In testimony whereof I affix my signature.

BURR LOBDELL.

Copies of this patent may be obtained for five cents each, by addressing the "Commissioner of Patents, Washington, D. C."